INVENTOR
Leo A. Gary
by McDougall, Hersh, Scott and Ladd Att'ys

Dec. 2, 1969 L. A. GARY 3,482,260

SYNCHRONIZED MEMORY SYSTEM FOR A SELECTIVE DISCHARGE CONVEYER

Filed Nov. 15, 1968 3 Sheets-Sheet 2

Dec. 2, 1969 L. A. GARY 3,482,260

SYNCHRONIZED MEMORY SYSTEM FOR A SELECTIVE DISCHARGE CONVEYER

Filed Nov. 15, 1968 3 Sheets-Sheet 3

United States Patent Office 3,482,260
Patented Dec. 2, 1969

3,482,260
SYNCHRONIZED MEMORY SYSTEM FOR A SELECTIVE DISCHARGE CONVEYOR

Leo A. Gary, Chicago, Ill., assignor to The Spra-Con Company, Chicago, Ill., a corporation of Illinois
Filed Nov. 15, 1968, Ser. No. 776,074
Int. Cl. B65g 47/34, 43/00
U.S. Cl. 214—11 12 Claims

ABSTRACT OF THE DISCLOSURE

A memory system for conveyors which includes a plurality of separate article carrying means of the type having mechanisms for discharging articles when the article carrying means reaches a predetermined location along the path of conveyor movement. The memory system comprises a memory wheel, a magnetic writing head for applying codes to a magnetic track carried on the wheel, and a plurality of magnetic reading heads. The reading heads are connected to the discharge mechanisms associated with the respective discharge locations situated adjacent the conveyor. Each reading head is designed to operate circuit elements connected thereto when a code unique to that reading head moves into position opposite that head. The writing and reading operations are accomplished through the use of electronic counters of the type including flip-flop means and associated gates.

This invention relates to a memory system designed for use in conjunction with conveyors adapted to carry articles and to discharge the articles at pre-selected locations along the conveyor path.

Memory systems have previously been devised for operation in conjunction with conveyors. A description of a memory system is found, for example, in Harrison et al. Patent No. 3,167,192. This system involves the use of a memory timer employing a series of balls which may be successively dropped into a channel in response to successive operations of a solenoid which is controlled by keys on a selector board. The balls can then be subjected to a stepping operation with the movement of the balls being controlled in phase with the movement of individual conveyor trays. The actuation of tripping means for a patricular tray will depend upon the number of balls inserted in the channel since the balls will serve as contacts in a circuit including a solenoid. Speaker Patent No. 3,034,665 also discloses a memory system used for tripping conveyor means.

It is a general object of this invention to provide an improved memory system for controlling the discharge of articles from individual conveyors, for example conveyors of the type employed in systems described in the aforementioned patents.

It is a more specific object of this invention to provide a greatly simplified memory system which is characterized by a very compact structure so that only a small amount of space is required for installation of the system, which is characterized by a relatively simple operating principle, and relatively simple operating parts so that unduly complicated operating and maintenance problems will not develop.

These and other objects of this invention will appear hereinafter and for purposes of illustration, but not of limitation, a specific embodiment of the invention is illustrated in the accompanying drawings in which.

The construction of this invention generally comprises a memory wheel having a single magnetic track located thereon. A magnetic write head is positioned adjacent the track, and a write-in circuit is located between this head and a coding keyboard. The keyboard is located adjacent the loading station for a conveyor. Immediately prior to the placement of an article on the conveyor, the keyboard operator determines the destination of the article, and operates the keys of the keyboard in accordance with this determination. This results in the delivery of signals to the magnetic write head whereby a code is placed on the magnetic track substantially simultaneously with the deposit of an article on the conveyor.

Magnetic read heads are located at a plurality of positions opposite the track on the memory wheel. These read heads read each code on the track, and signals are delivered to a circuit connected to each read head. A solenoid or other operating device is adapted to initiate an article discharging operation when the code read by the read head corresponds with the code required by the particular circuit. As will be explained, the memory wheel moves in synchronism with the conveyor so that a coded portion of the wheel will reach the appropriate read head simultaneously with the arrival of the article corresponding to the code at the desired discharge location.

Figure 1:
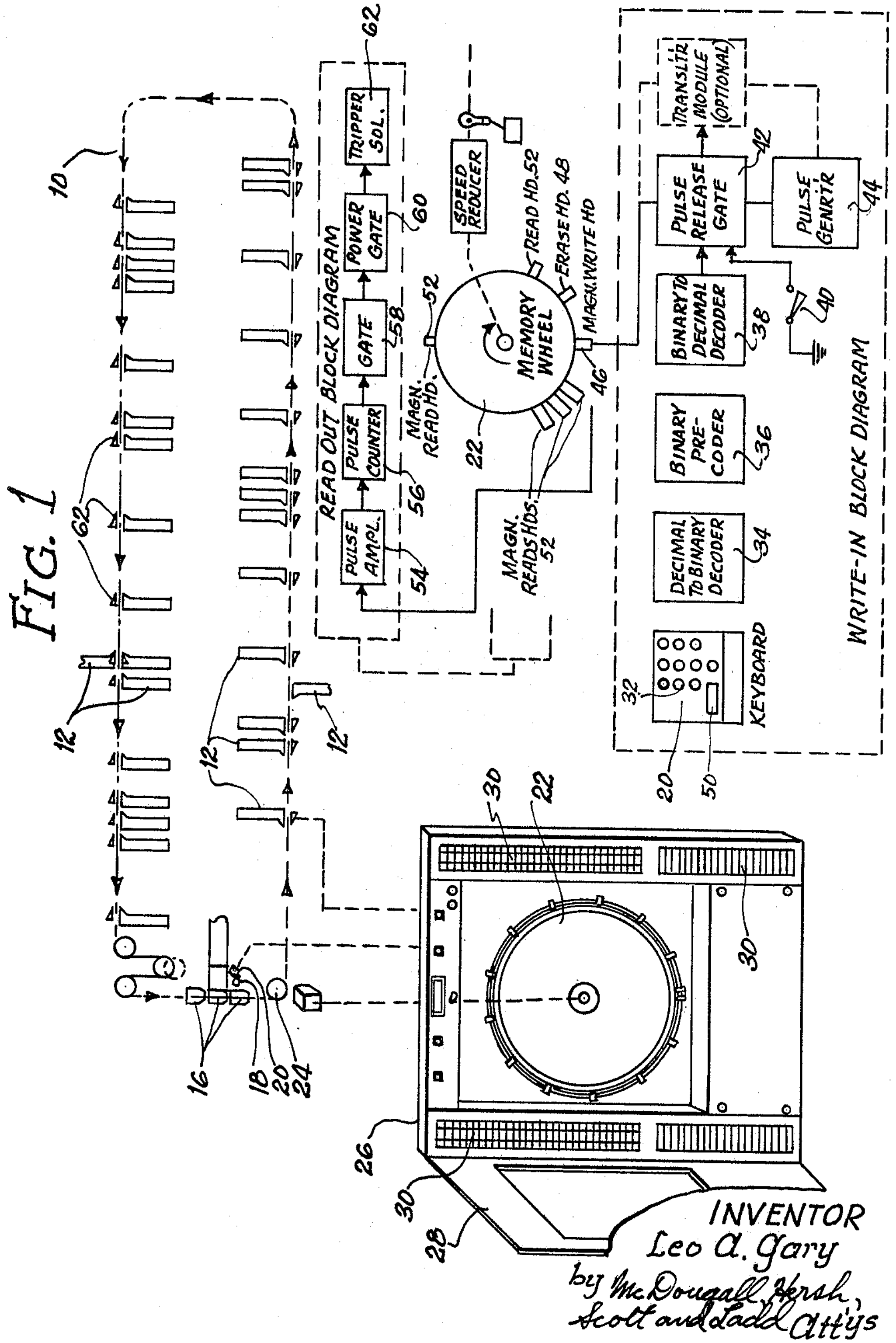
FIGURE 1 is a schematic illustration of the circuit elements and conveyor means utilized in the system of the invention.

FIGURE 1 of the drawings illustrates schematically a conveyor path 10 having a plurality of discharge stations 12 situated on either side of the conveyor path. A loading station 14 is provided adjacent the path of movement of trays 16 which form a part of the conveyor. For purposes of this description, it may be assumed that the trays 16 are of the type shown in either of the aforementioned patents wherein tripping means operated by solenoids are actuated by the memory means when a tray reaches a pre-determined discharge location. As will be explained, the circuit elements of this invention are designed to operate solenoids located at the respective discharge locations 12. It will be appreciated, however, that the output of the circuits connected to the read heads could be employed for operating other means designed to achieve a discharging operation.

FIGURE 1 also illustrates an operator 18 stationed adjacent keyboard 20. The keyboard 20, as shown in the write-in block diagram is connected to a memory wheel 22. The memory wheel 22 may be connected as shown in FIGURE 1 to a sprocket or the like 24 associated with a chain or other means moving in synchronism with the conveyor trays. Obviously, suitable gear reduction means may be interposed; however, direct driving connection between the memory wheel and the conveyor represents a preferred form of the invention in order to achieve the most reliable synchronous arrangement.

The memory wheel may be included in a cabinet 26 having a door 28. The cabinet includes side panels 30 consisting of integrated circuit elements of the type utilized in the write-in and read-out circuits. By providing these integrated circuit elements in panels in the manner shown, the elements can be easily replaced; thus, greatly simplifying maintenance operations. The electronic components and circuitry can be incorporated on printed circuit, plug-in type boards, for achieving this advantageous arrangement.

The write-in block diagram shown in FIGURE 1 includes the keyboard 20 having push buttons 32. The operation of these push buttons transmits signals to the decoder 34, pre-coder 36 and de-coder 38. A switch 40 is connected to the pulse release gate 42, and closing of the switch 40 allows signals from the pulse generator 44 to be transmitted through the release gate to the magnetic write head 46. The switch 40 may be located adjacent the loading station 14 for actuation by each conveyor tray as the tray is moved into position at the loading station. This arrangement insures transfer of the code pulses to the write head in timed sequence so that each code located on the magnetic track will have a definite spaced relationship with all other codes in the same manner as each tray on the conveyor has a definite spaced relationship with other trays. An erase head 48 is located adjacent the write head 46 so that each code will be removed as the wheel completes a cycle.

A plurality of read heads 52 are located in spaced relationship around the memory wheel. The read heads are adapted to transmit pulses to pulse amplifier 54, pulse counter 56 and gate 58. As will be explained, the gate 58 for the circuit of a particular discharge location is set to permit passage of signals only for a particular number of pulses counted. If the number of pulses is sufficient to operate the gate, then a signal will be delivered to the power gate 60 connected to tripper solenoid 62. As indicated, the solenoid 62 may correspond with tripper solenoids of the type shown in the aforementioned patents.

Figure 2:
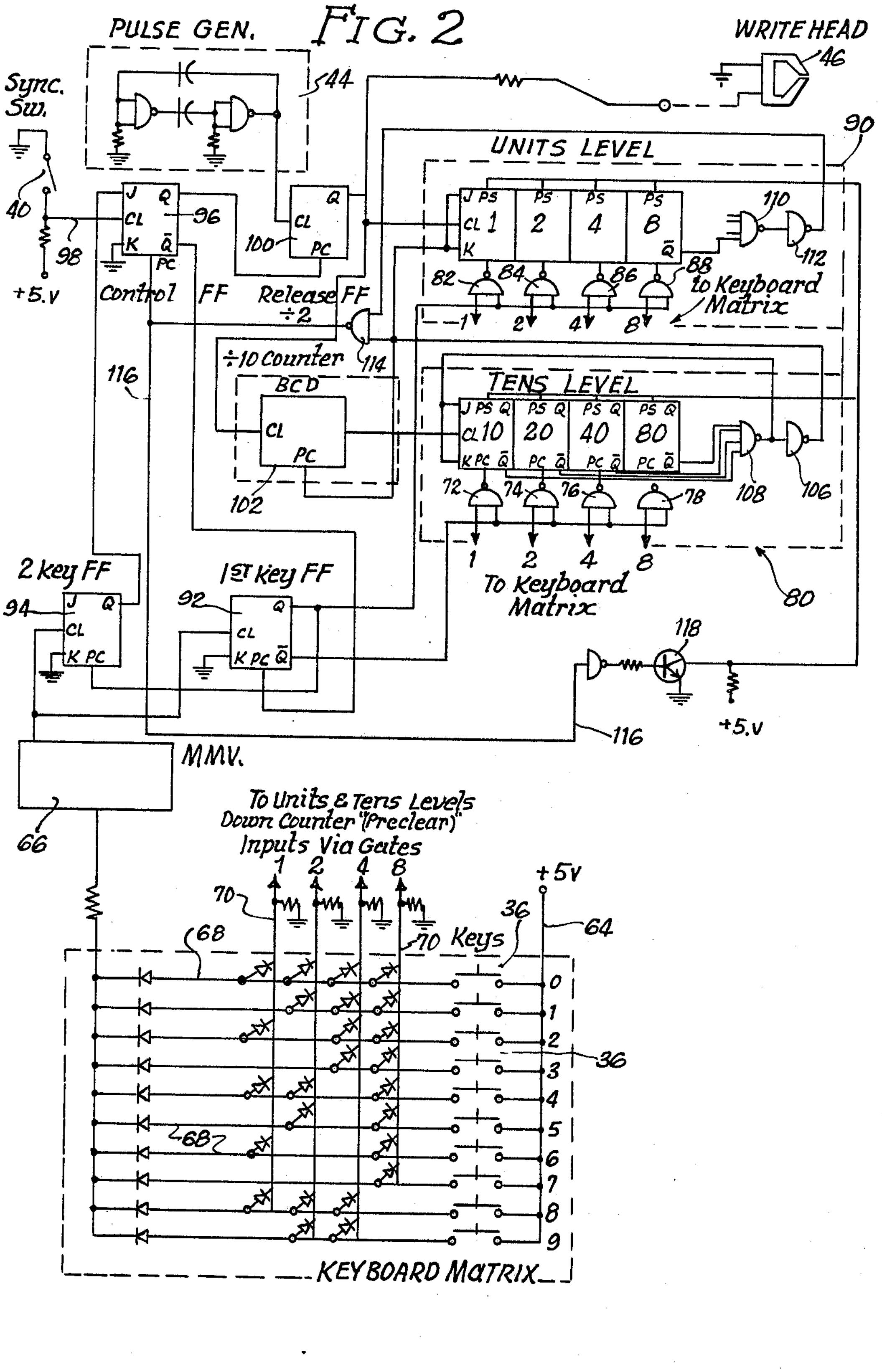
FIGURE 2 is a circuit diagram illustrating the coding and write-in circuitry employed in the construction; and, FIGURE 3 is a circuit diagram illustrating the readout arrangement of the invention.

FIGURE 2 illustrates the circuitry employed for achieving operation of a write head. In this circuit, the keys 36 are illustrated as contact means which close a circuit between the power line 64 and monostable multivibrator 66. A line 68 is connected between each key and the multivibrator, and there is also a connection through lines 70 to the input of each of the gates 72–78 of the parallel connected tens level flip-flop counter 80 and to the input of each of the gates 82–88 connected to the parallel connected units level flip-flop counter 90. Accordingly, whenever a key is pushed, high voltage is placed across one input terminal of one or more gates of the counters. For example, if the number 5 key is pushed, the gates 84 and 88 (two and eight) of the units level counter will be affected as well as the gates 74 and 78 (twenty and forty) of the tens level counter. As will be explained, these counter flip-flops are pre-cleared and do not participate in the down count during operation of the write head.

In utilizing the construction illustrated, a code is assigned to each of the discharge locations 12; for example, the locations may be numbered 1 through 99. The operator will then depress the keys 36, depending upon where the article being loaded on the conveyor is to be delivered. In the system illustrated, the first key punched by the operator will be the tens digit of a discharge location number and the second key, the units digit. Thus, if an article is to be discharged at the number 8 location, the operator will first push the zero key, and then the 8 key. If he number 64 location is desired, the operator will push the 6 and 4 keys in sequence.

In describing the operation of the system, it will be assumed that discharge is to take place at the number 39 location, and the operator will, therefore, first push the 3 key and then the 9 key as he loads the article on a conveyor tray. When the contacts associated with the 3 key are closed, one of the inputs for each of the gates 76, 78, 86 and 88 is activated. A signal is also delivered to the monostable multivibrator 66 through which a pulse is received by the clock input of the flip-flop 92.

This pulse toggles the flip-flop 92 whereby its Q output will be changed from a low state to a high state so that the pre-clear input of the flip-flop 94 becomes high. In this condition, the second depression of the key will send a clock signal through the multivibrator to the clock input of the flip-flop 94. In this connection, it should be noted that, with the exception of the flip-flops in the counters 80 and 90, the flip-flops illustrated must be pre-cleared before they can be toggled by a pulse to the clock input. In addition, the K inputs of the flip-flops 92, 94 and 96 are grounded so that toggling of the flip-flops will only occur once, and will not be repeated until the flip-flops receive a pre-clear pulse.

Before the depression of a key, the $\overline{Q}$ output of the flip-flop 92 is in the high state whereby one terminal of each of the and gates 72–78 will be high. The other terminal of one or more of the and gates will also go high depending upon which key is depressed. This will provide one or more pre-clear signals for the flip-flops of the tens level counter 80, and such signals operate to set-up the counters. The counters remain deactivated until the count down cycle.

The gates 82–88 are set to transmit pre-clear signals to the units level flip-flops through the Q output of the flip-flop 92. This Q output, of course, goes high as soon as the flip-flop 92 is toggled. When the second key is depressed, therefore, one or more of the gates 82–88 sends a pre-clear signal to one or more flip-flops of the associated counter.

The clock input of the control flip-flop 96 will receive toggling signals when the J input is high. This condition will occur when the second key is depressed and the flip-flop 94 is toggled. The clock signal for the control flip-flop 96 is sent through line 96 when the switch 40 is closed. As previously noted, the swich 40 may be located adjacent the loading station 14 whereby the switch will be closed by each of the trays 16 as the trays move past the loading station. It will, thus, be seen that the pressing of the keys 36 will operate to set the flip-flop counters; however, as will be explained, counting will not commence until the switch 40 is closed. Accordingly, the transfer of a code to the memory wheel will be directly related to the tray position.

When the control flip-flop 96 toggles, the Q output goes high thereby disabling the pre-clear signal of the "divide by 2" release flip-flop 100. The flip-flop 100 is then in a condition to accept pulses from the generator 44. In a typical form of the invention, the pulse generator will deliver 600 pulses per second. Since every other pulse is used to toggle the flip-flop, the Q output of the flip-flop 100 will be high at the rate of 300 pulses per second.

The Q output of the flip-flop 100 is connected to the clock input of "divide by 10" BCD counter 102, and to the clock input of the units level counter 90. The clock input of the units level counter does not accept the pulses at this point since this input will not be in the accepting state while the J and K inputs are low. The condition of the J and K inputs is controlled by the inverter 106 and gate 108 of the tens level counter 80. As will be explained, the units level J and K inputs will be changed to a high state only after the completion of the count at the tens level.

The count at the tens level is accomplished by means of pulses from the Q output of the flip-flop 100 which are delivered to the decade counter 102. This counter comprises a standard BCD counter which will deliver one pulse to the clock input of the tens level counter 80 for every 10 pulses received. If, as in the example referred to, the flip-flops 40 and 80 have been pre-cleared by a signal from the gates 76 and 78 when the count begins, then the $\overline{Q}$ ouputs for the 40 and 80 flip-flops are high so that the connected terminals of the gate 108 are high. When three pulses have been deliver to counter 80, then the $\overline{Q}$ outputs of the 10 and 20 counters will also go high so that the gate becomes conducting. The low output of the gate 108 will place the J and K inputs of the number 10 flip-flop in the low state whereby additional pulses cannot be received by the tens level counter. This same low output will be inverted to a high by the inverter 106 whereby the J and K inputs of the units level counter will go high so that additional pulses from the flip-flop 100 will be received by the units level counter.

The $\overline{Q}$ outputs of the units level counter are each connected by lines (three of which are not shown) to the gate 110. When the units count is completed, the gate becomes conducting and the low output of the gate is delivered to inverter 112 whereby one terminal of the gate 114 goes high. The other terminal of the gate 114 is already in the high state since it is connected to the inverter 106.

The output of gate 114 then causes the pre-clear input of the control flip-flop 96 to go low so that this control flip-flop will not accept clock pulses when the switch 40 is closed again unless a new code has been applied.

The output of the gate 114 is also connected through line 116 to transistor 118 which, when triggered causes the pre-set inputs of each flip-flop in the counters 80 and 90 to go high thereby pre-setting the counters for the next coding operation. The $\overline{Q}$ output of the control flip-flop 96 pre-clears the flip-flop 92 to place this flip-flop in the ready condition for the next coding operation.

As long as the release flip-flop 100 accepts signals from the pulse generator, pulses from the Q output will be delivered to the magnetic writing head 46. It will be apparent that the number of signals transmitted to the write head will correspond with the number of signals necessary for operating the units level and tens level counters. Thus, in the case where the keys 3 and 9 are operated, 39 pulses will be transmitted to the write head (30 being necesary to operate the tens level counter and 9 to operate the units level counter). It will be understood in this connection that these counters are set to down count during the writing operation.

Figure 3:
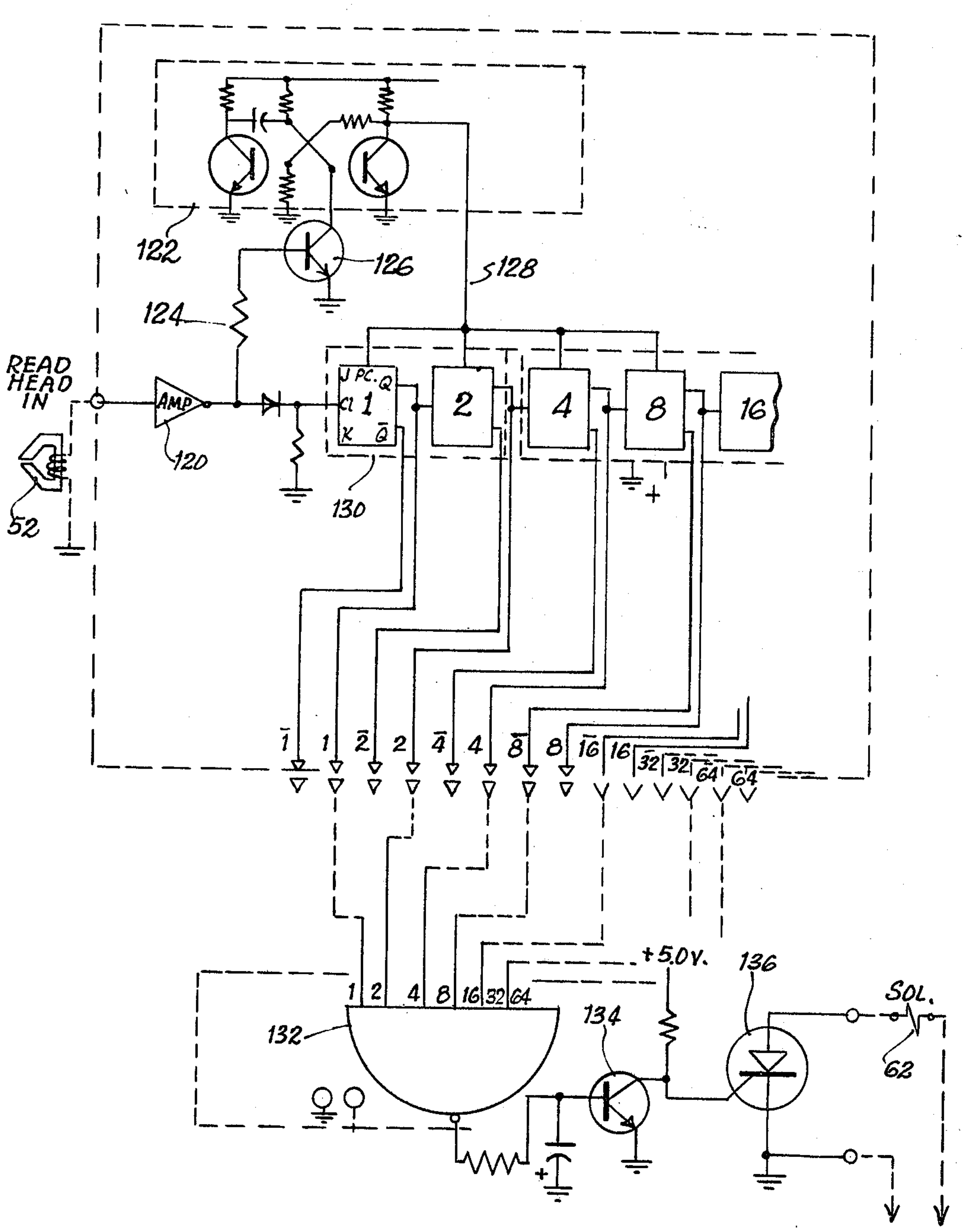

As previously noted, the code applied to the memory wheel will move adjacent a plurality of reading heads 52 while the tray carrying the coded article is moving past discharge locations corresponding with each of the reading heads. These reading heads are each connected to a circuit of the type shown in FIGURE 3. This particular circuit is set to operate at the number 39 discharge location. As a general proposition, it should be noted that the circuit is designed to count 39 pulses and when this number of pulses is counted, the circuit will deliver a signal which will result in the operation of the solenoid 62 at the number 39 discharge location. Continuing with the previous example, it will be assumed that 99 discharge locations are located along side the conveyor. The circuitry associated with the very last read head must be the circuit for counting the maximum number of pulses so that only the maximum code on the memory wheel will activate the circuit.

The circuit consists of an amplifier 120 which amplifies signals delivered by the read head 52. The signals from the amplifier are passed to a monostable multivibrator 122 through resistor 124 and transistor 126. The output of the multivibrator extends through line 128 to the preclear inputs of the flips-flops in the series connected counter 130. The multivibrator is designed to hold the preclear input of counter 130 in the high state after the last pulse is generated by the code on the track so that a sustained signal will be available for operating the solenoid 62. In a typical system, the magnetic track may be set so that one second of movement past a read head is assigned for each code. The actual code may be delivered in one-third or less of that time (333 milliseconds for the maximum of 99 pulses) and the multivibrator may then be set to operate for an additional 167 milliseconds to provide the sustained signal. The counter is then re-set in the last half second.

The clock input of the counter 130 also receives the amplified signals and the Q and $\overline{Q}$ outputs of the respective flip-flops are connected to the and gate 132.

In the embodiment shown, the Q outputs of the number 1, 2, 4 and 32 flip-flops are connected to the gate leads. The $\overline{Q}$ outputs are connected to the number 8, 16 and 64 leads of the gate. When all of these outputs are in the high state at the same time, a condition which will occur when the 39th pulse is delivered to the counter, the gate 132 will become conducting whereby a signal will be delivered to the transistor 134. The rectifier 136 is then triggered whereby the solenoid 62 will be energized.

In the described arrangement, the memory wheel 22 is illustrated as a solid drum. This drum may have a diameter of about 20 inches so that the entire memory storage system can be enclosed in a dust and oil tight cabinet about 3 feet square and 8 inches deep. Although the use of the solid drum is desirable for this reason, it will be appreciated that an endless magnetic tape or belt may be employed in place of the drum.

One distinct advantage of the instant invention is that only a single memory track is necessary since the BCD system permits the use of a single code for each discharge station irrespective of the number of stations in the system. As previously noted, this arrangement is also highly desirable from a maintenance standpoint since the components employed are reliable and can be located for convenient replacement in the event that this becomes necessary.

That which is claimed is:

1. In a conveyor system wherein a plurality of spaced-apart article carrying means are associataed with the conveyor, a loading station for depositing articles on the article carrying means, a plurality of discharge locations positioned along the path of conveyor movement, and memory means for receiving a code as an article is deposited on the conveyor, the memory means initiating automatic operation of discharge means for said articles when the articles reach a predetermined discharge location, the improvement wherein said memory means comprise a magnetic track, means for moving said track in synchronized relation to the movement of said conveyor, a magnetic write head, a coding keyboard having push buttons which, when pressed, transmit signals to a writing circuit connected to said write head, said circuit including at least two electronic counters, first and second depressions of keys on said keyboard operating to set said counters, a pulse generator, an electronic switch means, said switch means operating upon setting of said counters to permit pulses to be transmitted from said pulse generator to said counters and simultaneously to said write head for providing a code on said track, a plurality of magnetic read heads positioned in spaced relationship around said track, one of said read heads being provided for each discharge location, and a reading circuit connected between each read head and the discharge means for the corresponding discharge location, said reading circuit including a third electronic counter for counting signals developed by the codes on said track, and means connected between said third counter and said discharge means for initiating operation of said discharge means when the signals counted correspond with the code for the discharge location.

2. A system in accordance with claim 1 wherein the first and second electronic counters in said writing circuit comprise binary code-decimal counters which count down in response to pulses from said pulse generator, and wherein the pulses sent to said write head are discontinued as soon as said counters count down to zero.

3. A system in accordance with claim 2 wherein said keyboard includes a plurality of selectively operable keys, said electronic switch means including a pair of electronic switches connected to said keyboard, and gates connected to each counter stage of said first and second counters, each of said keys being connected to said pair of switches, and selected keys being connected to each of said gates, and wherein sequential operation of the keys sends input pulses to selected gates and to each of said pair of switches, one of said pair of switches operating to set the first and second counters and the other of said pair of switches operating to set the circuit for receiving pulses from said pulse generator.

4. A system in accordance with claim 3 wherein the other of said pair of switches is connected to a third electronic switch, said third switch operating to control the sending of pulses from said pulse generator, and means for controlling the operation of said third switch, said means being operated by said conveyor as each article carrying means moves into position for receiving articles whereby pulses are sent to said write head in timed relation to the position of said article receiving means.

5. A system in accordance with claim 4 including a fourth electronic switch connected between said pulse generator said counters, said third switch controlling the operation of said fourth switch whereby said fourth switch will release pulses to said write head and to said first and second counters when said means are operated by the conveyor.

6. A system in accordance with claim 5 including means connected between said counters directing pulses from said fourth switch to only one of said counters until this counter counts down to zero, and then operating to direct pulses to the second counter.

7. A system in accordance with claim 6 wherein alternating pulses from said pulse generator operate to toggle said fourth switch whereby the output from said fourth switch is equal to one-half the number of input pulses.

8. A system in accordance with claim 6 wherein said first and second counters comprise a units level counter and a tens level counter, and including a divide by 10 binary code-decimal counter connected between the output of said fourth switch and the input of said tens level counter whereby one pulse is fed to the input of said tens level counter for every 10 pulses fed to said write head.

9. A system in accordance with claim 1 wherein the means connected between said third counter and said discharge means comprises an AND gate connected to an output terminal of each binary counter stage of said counter, said gate operating to pass current for operating said discharge means when said counter has counted up to the level designated for the corresponding discharge location.

10. A system in accordance with claim 9 including means associated with said third counter for sustaining the counter in pulse receiving condition, and wherein said last mentioned means operates to re-set the counter after the magnetic code being counted has passed the read head and before the next magnetic code on the track reaches the read head.

11. A system in accordance with claim 10 wherein said discharge means comprises a solenoid adapted to operate mechanical means for removing articles from the conveyor.

12. A system in accordance with claim 1 wherein said magnetic track is formed on the rim of a wheel mounted in a cabinet, said circuits comprising solid state integrated circuit elements mounted in panels located within the cabinet around said wheel.

References Cited

UNITED STATES PATENTS

| | | | |
|---|---|---|---|
| 2,735,987 | 2/1956 | Camp et al. | 333—29 |
| 2,889,542 | 6/1959 | Goldner et al. | 340—174 |
| 2,923,420 | 2/1960 | Dyer et al. | 214—11 |
| 2,941,666 | 6/1960 | Sims | 214—11 XR |
| 3,144,948 | 8/1964 | Henig | 214—11 |

GERALD M. FORLENZA, Primary Examiner

RAYMOND B. JOHNSON, Assistant Examiner